June 7, 1955     E. W. BOUGHTON     2,709,904
FOOD SERVING UNIT
Filed July 6, 1950
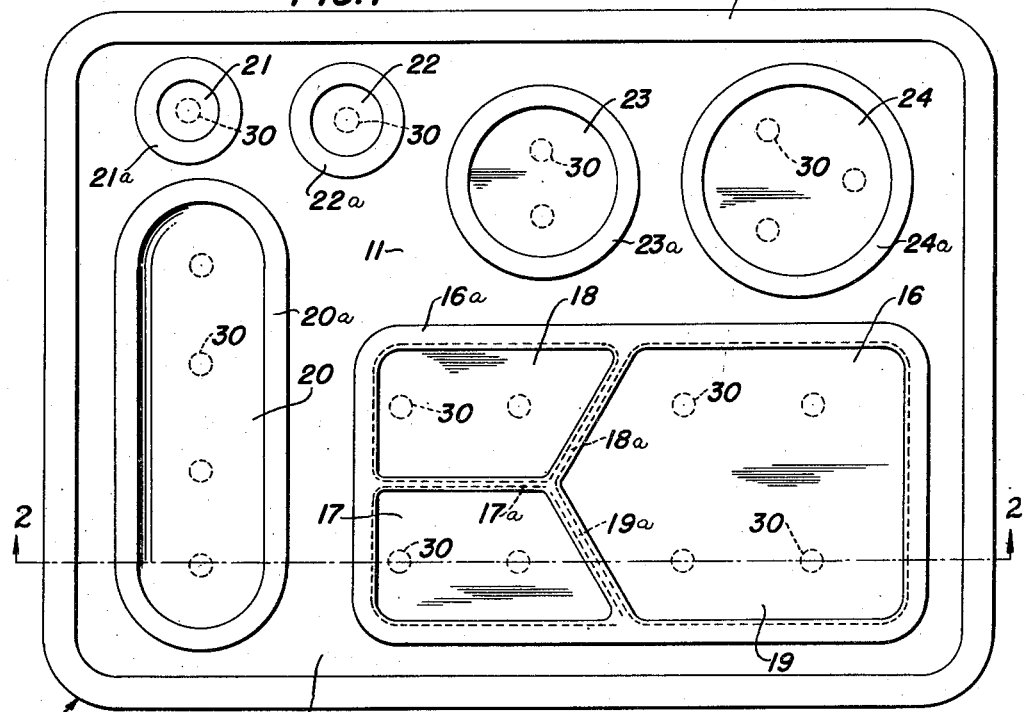
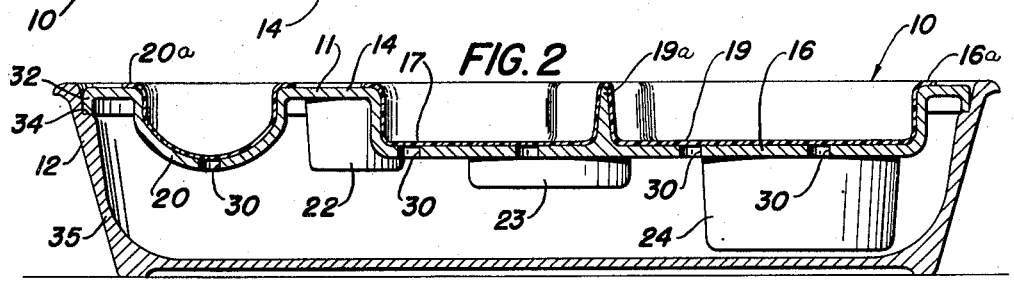
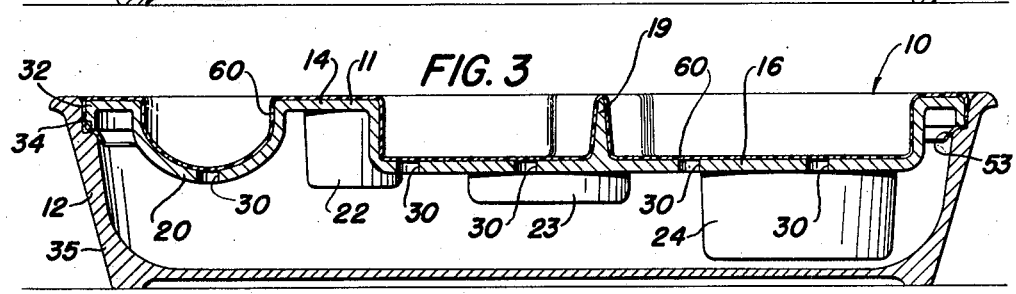
INVENTOR.
EMMA W. BOUGHTON
BY William Cleland
ATTORNEY

United States Patent Office 2,709,904
Patented June 7, 1955

2,709,904

FOOD SERVING UNIT

Emma W. Boughton, Akron, Ohio

Application July 6, 1950, Serial No. 172,231

3 Claims. (Cl. 65—15)

This invention relates to a food serving unit, and in particular relates to a food serving unit provided with a one-use, disposable liner means incorporated therein.

There are at present on the market one-use disposable serving dishes having separated food-receiving recesses. These, however, have usually been of well-known flimsy paper or papier mache construction which would not withstand substantial pressure of eating implements. Moreover, whether or not a backing member has been provided for such paper dishes, the latter have been too impractical and uneconomical to warrant general or household use by the public.

One object of the present invention is to provide a food serving unit including a rigid backing tray having supporting means therefor, and one-use, disposable food-receiving means which is inexpensive to manufacture and sanitary to use.

Another object of the invention is to provide a food serving unit of the character described which is particularly adaptable for general use to eliminate dish-washing.

These and other objects of the invention will be self-evident from the following brief description and the accompanying drawings.

Of the drawings:

Figure 1 is a top plan view of a food serving unit embodying the features of the invention.

Figure 2 is a vertical cross-section taken substantially on the line 2—2 of Figure 2.

Figure 3 is a vertical cross-section, similar to Figure 2, but illustrating a modified form of the invention.

Referring to the drawings and in particular to Figures 1 and 2 thereof, there is illustrated a food serving unit 10 including a food serving tray 11 of relatively rigid material, the same being maintained in elevated position by a supporting frame 12, and containing liners 16a, 20a, 21a, 22a, 23a, and 24a for the tray.

The tray 11 may be of any suitable size and shape, such as rectangular, and includes a flat, thin web portion 14 of porcelain, glass, plastic or other relatively rigid backing material, and a plurality of food-holding recesses of varying sizes and shapes integrally formed in the web. The recessed section 16 of the tray, designed primarily for receiving the main course of a meal, is sub-divided into smaller recessed areas 17, 18, and 19, by means of upstanding ribs 17a, 18a, and 19a. An elongated ovate recess 20 is provided to the left of the recessed section 16 (see Figure 1) for the reception therein of toast, rolls, butter or other food articles, the bottom being rounded for ease of cleaning. Spaced across the tray 11 also may be circular recesses 21, 22, 23, and 24 of varying diameters and depths for the reception therein of a salt shaker, a pepper shaker, a drinking cup, and a water glass, respectively.

The tray 11 is removably supported on frame 12 by provision of a downturned flange 32 around the perimeter thereof, firmly seated within a complemental seat portion 34 around the top of an upturned surrounding wall 35 of the support 12.

The liners 16a, 20a, 21a, 22a, 23a, and 24a, may comprise separate, one-use inserts of thin, inexpensive, flexible moisture impervious plastic material, preformed to fit within the respective recesses 16, 20, 21, 22, 23, and 24, of the tray 11 (see Figures 1 and 2). One substantially elastic material suitable for this purpose is "Pliofilm," which is a rubber hydrogen chloride sheet material adapted to be formed by use of pressure and heat, also by stretching with or without heat. Other thin materials having the desired qualities described, and suitable for receiving food without contaminating the same are available on the market. While the liners have been described in general as being preformed to desired shape for reception within the respective food-receiving recesses of tray 11, it is contemplated that flat sheets of thin, pliable, moisture-impervious material, may be distended across the top of the tray and conformed to the food-receiving recesses at the time of use.

For the purpose of preventing use of tray 11 without liners therein, relatively small apertures 30, 30 are provided in the bottoms of the food-receiving recesses, the same being small enough so as not to minimize the backing support for normal pressure of eating implements. Thus, food placed in the recesses, without liners being first placed therein, will tend to drain out through the recesses 30.

In use of the improved food serving unit the support member 12 may be placed upon any desired surface and the tray member 11 engaged within the perimetrical seat portions of the same as described. The liners 16a, 20a, 21a, 22a, 23a and 24a, may then be inserted within the respective food receiving recesses, the same either being preformed or forced into conformity with the shape of the respective recess. With the tray so prepared a meat portion may be served within the liner 16a in the recess 16, while vegetables and potatoes may similarly be served into the recesses 17 and 18 respectively. Toast and rolls together with the butter for spreading thereon may then be placed on the liner 20a in the receess 20, while a glass of milk, cup of coffee, and salt and pepper shakers may respectively be placed within the lined food receiving recesses 24, 23, 22 and 21. After the user has completed the meal, the various liner means may easily be removed from their respective recesses and disposed of together with the leavings.

In Figure 3 there is illustrated the tray 11 and support 12 mounted thereon as before, like parts, therefore being designated by like numerals. As a modification of the invention, however, the previously described liners are replaced by a one-piece liner 60 which covers the entire top of the tray 11 and is provided with a series of recesses conforming to the recesses in the tray. The liner 60 may be of the same sheet materials as previously described, either preformed to fit within the recesses of the tray, or conformed therein at the time of use. Marginal edge portions of the liner 53 may be firmly anchored onto tray 11, by being gripped between the flange 32 of the tray and the complemental seat portion 34 of the support 12.

Other modifications of the invention may be resorted to without departing from the spirit thereof or the scope of the appended claims.

What is claimed is:

1. A food serving unit, comprising a tray having perimetrical rim portions, said tray being of relatively rigid material and having a plurality of food-receiving recesses in the top thereof, a hollow support having upwardly presented seat portions receiving said rim portions therein to support the tray, and a one-use disposable liner means of thin, moisture impervious material conforming to the shapes of said recesses, the food receiving recesses of said tray having at least one perforation therein, the marginal edge portions of said disposable liner means being anchored in the seat portions between said support and said tray.

2. A food serving unit, comprising a tray having perimetrical rim portions, said tray being of relatively rigid material and having wall portions defining a plurality of food-containing recesses in the top thereof, a hollow support having upwardly presented seat portions complementally receiving said rim portions in seating relation therein to support the tray, and a one use disposable liner means of thin, moisture imprevious material conforming to the shapes of said recesses, the food-containing recesses of said tray having at least one relatively small perforation through the wall portion at the bottom thereof.

3. A food serving unit, comprising a tray having perimetrical rim portions, said tray being of relatively rigid material and having a plurality of food-containing recesses in the top thereof, a hollow support having upwardly presented seat portions complementally receiving said rim portions in seating relation therein to support the tray, and a one use disposable liner means of thin, flexible, moisture impervious material conforming to the shapes of said recesses, the marginal edge portions of said disposable liner means being releasably gripped by engagement thereof in the complemental seat and rim portions between said support and said tray, respectively.

References Cited in the file of this patent

UNITED STATES PATENTS

| Re. 20,789 | Bergstein | July 12, 1938 |
| D. 101,730 | Blackinton | Oct. 27, 1936 |
| 65,626 | White | June 11, 1867 |
| 697,247 | Harris | Apr. 8, 1902 |
| 1,061,026 | Thomas | May 6, 1913 |
| 1,105,715 | Sweers | Aug. 4, 1914 |
| 1,110,051 | Harpster | Sept. 8, 1914 |
| 1,502,245 | Green | July 22, 1924 |
| 1,511,265 | Chilson | Oct. 14, 1924 |
| 1,574,259 | Sarff | Feb. 23, 1926 |
| 1,583,512 | Worth | May 4, 1926 |
| 1,881,873 | Newcomb | Oct. 11, 1932 |
| 2,032,835 | Collins | Mar. 3, 1936 |
| 2,034,478 | Levy | Mar. 17, 1936 |
| 2,083,741 | Pearson | June 15, 1937 |
| 2,213,837 | Gill | Sept. 3, 1940 |
| 2,240,602 | Bartsch | May 6, 1941 |
| 2,315,591 | Carew | Apr. 6, 1943 |
| 2,323,356 | Rosay | July 6, 1943 |
| 2,332,173 | Shaffer | Oct. 19, 1943 |
| 2,531,671 | Dahl | Nov. 28, 1950 |